(12) United States Patent
Snyman et al.

(10) Patent No.: US 10,855,484 B2
(45) Date of Patent: Dec. 1, 2020

(54) ELECTRONIC CONTROLLER FOR HOUSEHOLD ENERGY CONTROL BASED ON TIMING AND TARIFF DATA

(71) Applicant: University of South Africa, Pretoria (ZA)

(72) Inventors: Lukas Willem Snyman, Pretoria (ZA); R. Kene, Pretoria (ZA)

(73) Assignee: University of South Africa, Pretoria (ZA)

( * ) Notice: Subject to any disclaimer, the term of this patent is extended or adjusted under 35 U.S.C. 154(b) by 171 days.

(21) Appl. No.: 15/741,474

(22) PCT Filed: Jul. 1, 2016

(86) PCT No.: PCT/ZA2016/050021
§ 371 (c)(1),
(2) Date: Jan. 2, 2018

(87) PCT Pub. No.: WO2017/008090
PCT Pub. Date: Jan. 12, 2017

(65) Prior Publication Data
US 2019/0013959 A1    Jan. 10, 2019

(30) Foreign Application Priority Data

Jul. 3, 2015 (ZA) .................................. 2015/04789

(51) Int. Cl.
*H04L 12/28* (2006.01)
*H02J 3/14* (2006.01)
*H02J 3/38* (2006.01)

(52) U.S. Cl.
CPC ............ *H04L 12/2816* (2013.01); *H02J 3/14* (2013.01); *H02J 3/382* (2013.01); *H02J 2310/14* (2020.01);

(Continued)

(58) Field of Classification Search
USPC .......................................................... 700/295
See application file for complete search history.

(56) References Cited

U.S. PATENT DOCUMENTS 7,561,977 B2 * 7/2009 Horst ........................ H02J 3/14
                                                        700/295
8,560,133 B2 * 10/2013 Venkatakrishnan ... G06Q 50/06
                                                        700/291

(Continued)

OTHER PUBLICATIONS

Ozturk, IEEE smart grid, vol. 4, No. 2, Jun. 2013 (Year: 2013).*

*Primary Examiner* — Md Azad
(74) *Attorney, Agent, or Firm* — Adler Pollock & Sheehan P.C.

(57) ABSTRACT

The present invention discloses a smart microprocessor and sensor based controller system that enables selective management of energy supply into a household of electrical appliances through individually switching on or off of individual load lines in a domestic household based on external information fed in from external sensors regarding the household's demand, time data and/or tariff data, wherein, based on the information received, the controller system manages the supply of energy to the household such that peak load of an electrical grid is reduced by selectively supplying electrical energy to high household loads, such as swimming pools, at low electrical grid demand time. The controller system includes smart switching devices, microprocessor logic, software algorithms, and timing devices used to control the switching processes.

8 Claims, 2 Drawing Sheets

Figure 1:
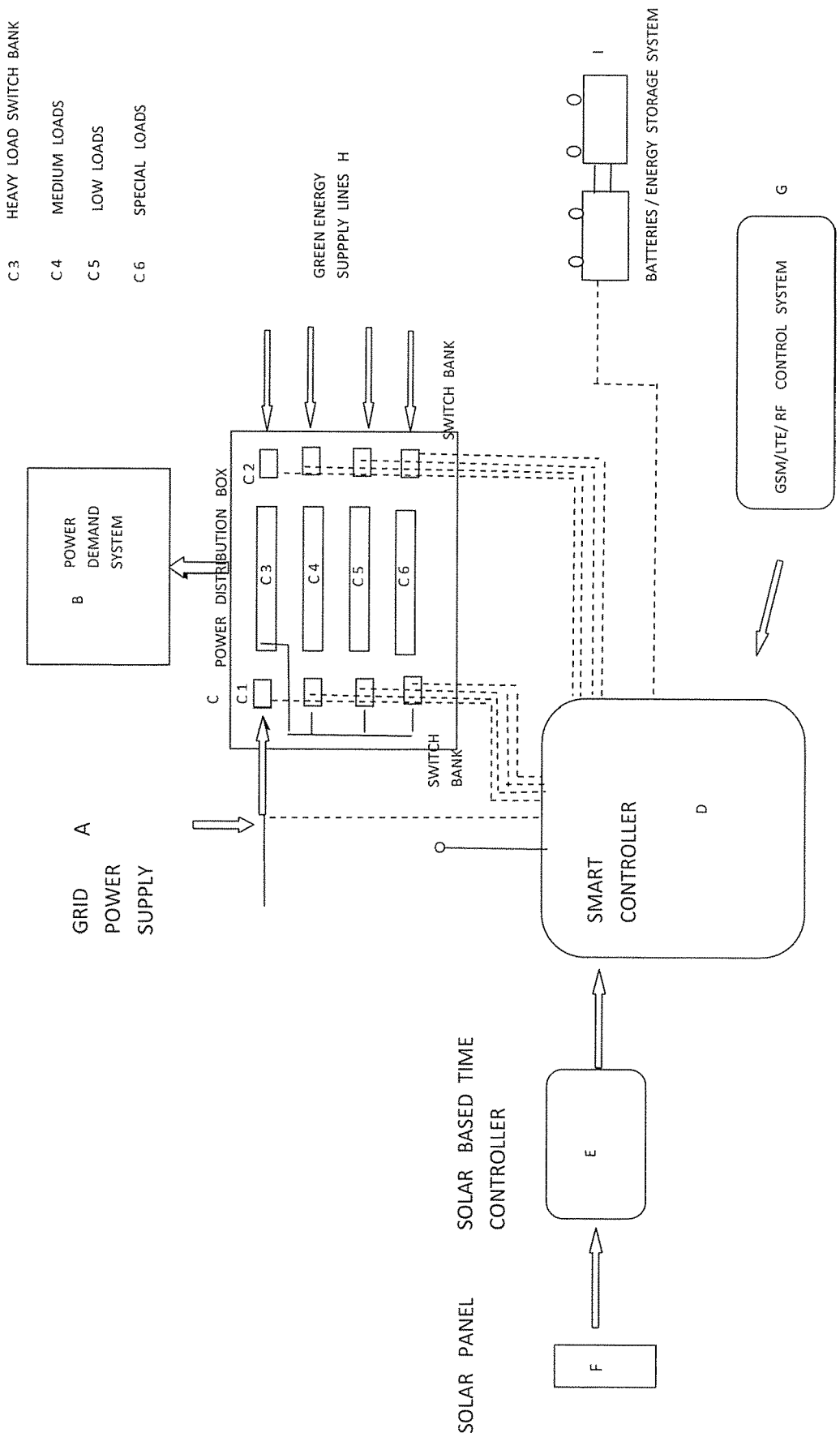

(52) U.S. Cl.
CPC ..... *H02J 2310/64* (2020.01); *H04L 2012/285* (2013.01); *H04L 2012/2843* (2013.01); *Y02B 70/30* (2013.01); *Y02B 70/3225* (2013.01); *Y04S 20/20* (2013.01); *Y04S 20/222* (2013.01); *Y04S 20/242* (2013.01)

(56) References Cited

U.S. PATENT DOCUMENTS

| | | | |
|---|---|---|---|
| 2003/0009265 A1* | 1/2003 | Edwin | G06Q 10/06 700/295 |
| 2006/0276938 A1* | 12/2006 | Miller | G06Q 50/06 700/295 |
| 2008/0133065 A1 | 6/2008 | Cannon et al. | |
| 2010/0218108 A1* | 8/2010 | Crabtree | G06Q 50/06 715/738 |
| 2012/0109395 A1 | 5/2012 | Finch et al. | |
| 2013/0151012 A1 | 6/2013 | Shetty et al. | |
| 2013/0274938 A1 | 10/2013 | Ahn et al. | |

* cited by examiner

ELECTRONIC CONTROLLER FOR HOUSEHOLD ENERGY CONTROL BASED ON TIMING AND TARIFF DATA

CROSS REFERENCE TO RELATED APPLICATIONS

This application is a national phase filing under 35 U.S.C. § 371 of International Application No. PCT/ZA2016/050021 filed Jul. 1, 2016, which claims priority from South African application number ZA2015/04789, filed Jul. 3, 2015, the entire contents of which is hereby incorporated by reference herein.

FIELD OF THE INVENTION

The invention relates to an electronic controller for energy control based on timing and tariff data.

SUMMARY OF THE INVENTION

According to a first aspect of the invention, a smart microprocessor and sensor based controller system is provided that enables selective management of energy supply into a household through individually switching on or off of individual load lines in a domestic household based on external information fed in from external sensors regarding the household's demand, time data and/or tariff data, wherein, based on the information received, the controller system manages the supply of energy to the household such that peak load of an electrical grid is reduced by selectively supplying electrical energy to high household loads, such as swimming pools, at low electrical grid demand times.

Where the household tariff is a function of load demand, the controller system may manage the overall management of electrical energy to the household appliances such that the household electricity bill is reduced.

Optionally, the electrical grid supplier could also switch on or off heavy loads near or in the household from an external control point.

The controller system may enable selective load management in households per time in larger townships and cities as a whole, and enable reduction of the net load as experienced by the electricity grid supplier on a large scale.

The controller system may include smart switching devices, microprocessor logic, software algorithms, and timing devices used to control the switching processes.

Remote initiated switching by the controller system may be overridden by internal decision making processes and controlled through GSM from a third party controller. This overriding may be by the owner of the household or the electricity grid supplier.

As an example, South Africa is currently experiencing unexpected power interruptions. This is not only affecting household resident management, but also affects national productivity, such as industrial and mining sectors. A selective management system based on microprocessor pre-programmed decisions and electricity feed information could greatly alleviate these problems.

Thus, the invention extends to a smart household microelectronic energy controller system that interfaces with a household electricity switching and distribution box, such as that in South African houses, and is referred to locally as a DB board, which controller system manages energy supply to loads in the household selectively and/or individually.

The smart household microelectronic energy controller system may manage energy supply to loads in the household individually, according to different clock times prevailing during the day.

The smart household microelectronic energy controller system may manage energy supply to loads in the household individually according to the different prevailing price per energy tariffs per clock time during the day.

The smart household microelectronic energy controller system may be powered and synchronised by the solar intensity as sensed by an external sensor, and uses the maximum average light intensity as incident during the day to synchronise and to control the energy switching or load shedding to individual loads in the household.

The smart household microelectronic energy controller system may be externally controlled remotely through radio frequency communication from a remote location, for example, so as to reduce household energy usage during peak electricity grid load times.

The smart household microelectronic energy controller system may selectively feed in green energy into the house as available directly from separate lines, or as stored in energy storage systems beforehand so as to reduce the nett load on the electricity grid.

In the context of this patent specification, the term "green energy" is used to denote electricity obtained from solar panels, wind power, hydro power, and other sources of electricity which do not use combustion of hydrocarbons such as coal, oil and derivatives thereof, and gas to generate electricity and may include the combustion of waste, bio-fuel, and biogas, as well as nuclear power.

The smart household microelectronic energy controller system may be used in an office environment or public energy supply areas in cities.

DESCRIPTION OF THE INVENTION

The invention will now be described by way of non-limiting example only, with reference to the accompanying diagrams. In the diagrams, FIG. 1 shows a diagram of a power supply system using a smart microprocessor and sensor based controller system which enables selective management of energy supply into a household; and FIG. 2 shows a representation of a microprocessor based controller system used in the invention.

Figure 2:
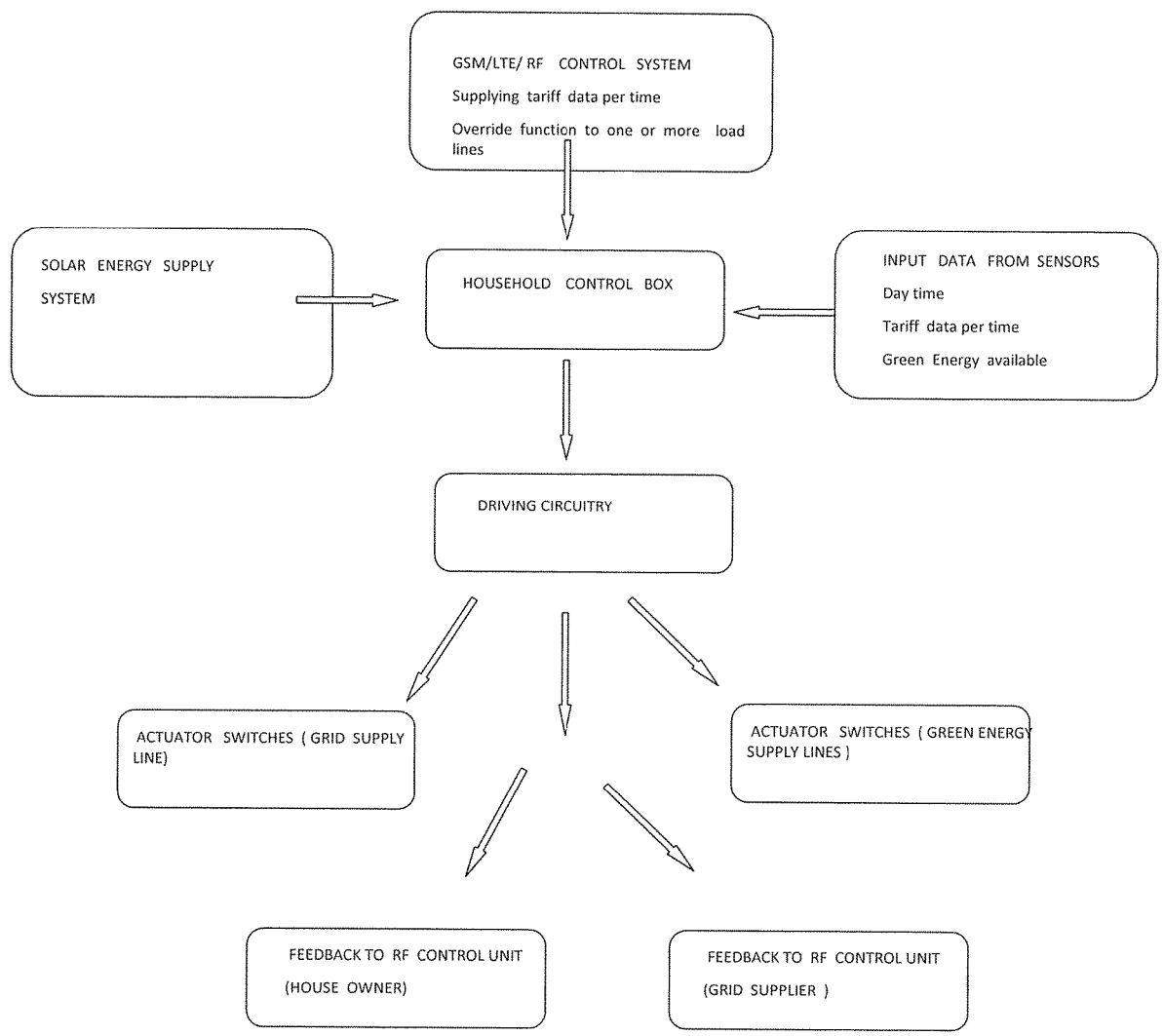

All reference numerals hereafter refer to FIG. 1 and FIG. 2 wherein the invention is illustrated by way of non-limiting example only.

An embodiment of the system, as illustrated in FIG. 1, consists of four sub-components, i.e., a Grid Power Supply System A, A Power Demand System (B), a specially Designed Power Distribution Box (C), a Smart Energy Controller (D), a Solar Energy Secondary Power Supply and Timing System Unit E, and a RF Remote Control Unit (G).

Energy is supplied through the city network grid (A) to a specially designed power distribution box which redistributes power to separate lines through a series of power relay switches (C1), each serving a different load category e.g. heavy, medium, low, essential lighting, special load systems, requiring special phase requirements (C2 to C6). More than one load can be connected in parallel to a specific line C3 to C6.

A second switch bank C2 is optional which is individually supplied by separate lines supplied either directly from green energy supplies such as solar or thermal systems, or indirectly after storage in a battery or thermal energy storage system.

The distribution box switches are arranged such that all heavy loads are connected to one subline (C3); all medium loads are connected to a second separate line (C4); all light loads (e.g., lights, light appliances, plugs etc.) are connected to a third line (C5), and all special equipment such as computers, laptops, electronic sub-control equipment which require special phase control, are connected to a fourth line (C6).

Each of these lines are subsequently connected at any one stage either to the city grid network or alternatively to the solar energy backup supply by means of a series of electronic switches which are controlled by a smart microelectronic energy controller (D). The switches can typically be composed of MOSFET (Metal Oxide Semiconductor Field Effect Transistor) or thyristor type switches as available on the free market.

The distribution box switches are arranged such that all heavy loads (e.g., stoves, geyser, swimming pool and spa pumps) are connected to one subline; all medium loads (e.g., fridges, televisions, hairdryers, kettles etc.) are connected to a second separate line; all light loads (e.g., lights, light appliances, plugs etc.) are connected to a third line, and all special equipment such as computers, laptops, electronic sub-control equipment which require special phase control, are connected to a fourth line. Each of these lines are subsequently connected at any one stage either to the city grid network or alternatively to the solar energy backup supply by means of a series of electronic switches which are controlled by a smart controller. The switches can typically be composed of MOSFET or thyristor type switches as available in the free market.

A Microprocessor based controller (D) is considered to be the heart of the system. It consists of several subunits as highlighted in FIG. 2, microcontroller, sensor inputs and input amplifiers and buffers, a GSM (Global System for Mobile Communication) or RF (Radio frequency) based receiver module, a timing module, and a series of actuators that are able to drive high power switches The data base of the timing unit is of crucial importance. The timer unit is controlled by an external solar powered module and sensor unit. This unit senses the incidence radiation from the sun during daytime very accurately, and through a series of secondary control circuitry resets the timer in the controller module D every day at noon 12:00 am. It also supplies the whole of the controller unit with solar power even during times of power outages.

The main purpose of the controller unit is to import from a RF remote control unit, either from the household owner or the grid energy supply network, information about the tariff prices per hour. Based on the information that the controller receives, it then makes clever decisions on when to switch on or switch off heavy loads such as the household geyser, swimming pool, floor heating systems and cooling systems. A recycling algorithm makes decisions by cycling through all the data and sensor information as available at a specific moment in time. If high tariffs are valid, it senses the status of temperature in the geyser, swimming pool, floor heating, cooling in fridges and, if appropriate, switch off these loads during high tariff periods. During low tariff periods, it again gives preference to high load appliances and gives preference to manage each of the other appliance lines in the house optimally.

When energies are available from alternative sources, either as available directly from sun or thermal systems, or as accumulated in storage systems beforehand, the smart controller can selectively switch in these energy resources to alleviate the net load on the grid supply network.

The system can hence achieve two beneficial purposes for both the home owner and the grid energy supplier:
1) It can keep high load appliances automatically off during peak and heavy load demand periods for the grid energy supplier. The collective benefit if a large number of households in a township or large city uses the same standardised system, could be enormous.
2) In areas where different tariffs are valid for different periods of the day, the smart controller can manage the energy flow into the household intelligently, such that the power usage bill of the house owner is minimised over a period of one month or more. The savings for the house owner can be enormous, if considered over an extended period of time.
3) The controller system runs from solar energy, and uses the cyclic intensity of the sun to adjust the clock timer of the controller. This ensures accuracy to the managing cycles of the controller and makes it completely independent from other power sources or timing control circuitry.

What is claimed is:

1. A system comprising:
    at least one controller having a microprocessor, the at least one controller coupled to at least one sensor and configured to enable selective management of energy supply into a household;
    a plurality of external sensors communicatively coupled to and providing the at least one controller with external information including the household energy demand, time data, or tariff price data per hour, to enable selectively switching on or off of individual load lines in the household based on the external information;
    a recycling algorithm operating on the at least one controller and making decisions by cycling through the external information as available at a specific moment in time, thereby enabling the at least one controller to optimize the supply of energy to the household by reducing or increasing supply of electrical energy to high household loads based on assessment of the external information;
    a power distribution box interfacing with the at least one controller to enable the at least one controller to selectively feed in green energy into the household, via the power distribution box, on a priority basis as available directly from separate lines or as stored in energy storage systems to reduce net load on the electricity grid; and
    a solar powered module communicatively coupled to the at least one controller, the solar powered module configured to sense incidence radiation from the sun and reset the at least one controller based on the sensed incidence radiation.

2. The system of claim 1, wherein the system is configured to manage the overall management of supply of electrical energy to a plurality of household appliances such that a household electricity bill is reduced.

3. The system of claim 1, further comprising an external control point communicatively coupled to the system and operable to automatically switch on or off heavy loads near or in the household.

4. The system of claim 1, wherein the system is further configured to enable selective load management in households per time in larger townships and cities as a whole, and reduction of the net load as experienced by an electricity grid supplier on a large scale.

5. The system of claim 1, wherein the at least one controller manages energy supply to loads in the household individually, according to different clock times prevailing during a day.

6. The system of claim 1, wherein the at least one controller manages energy supply to loads in the household individually according to the different prevailing price per energy tariffs per clock time during the day.

7. The system of claim 1, wherein the at least one controller is solar powered and synchronised by a solar intensity as sensed by an external sensor, and uses the maximum average light intensity as incident during the day to synchronise and to control the energy switching or load shedding to individual loads in the household.

8. The system of claim 1, wherein the at least one controller is externally controlled remotely through radio frequency communication from a remote location so as to reduce household energy usage during peak electricity grid load times.

* * * * *